United States Patent Office 3,476,694
Patented Nov. 4, 1969

3,476,694
LACQUER COMPOSITIONS CONTAINING NITROCELLULOSE, AN ETHYLENE/VINYL ACETATE COPOLYMER, AND SUCROSE ACETATE ISOBUTYRATE
Warren Bowman, Wilmington, Del., Dennis M. Roberts, Cincinnati, Ohio, and Paul G. Sellger, Pittsburgh, Pa., assignors to E. I. du Pont de Nemours and Company, Wilmington, Del., a corporation of Delaware
No Drawing. Filed Nov. 1, 1966, Ser. No. 591,107
Int. Cl. C08b *21/14, 37/16*
U.S. Cl. 260—17                                    4 Claims

ABSTRACT OF THE DISCLOSURE

This invention relates to nitrocellulose lacquers. More particularly, the invention relates to lacquers containing nitrocellulose, a particular ethylene/vinyl acetate copolymer and sucrose acetate isobutyrate.

BACKGROUND OF THE INVENTION

Nitrocellulose lacquers have been formulated which have a wide variety of properties. Generally, it is desirable to obtain a lacquer which provides hard coatings. Such lacquers are available; however, in many cases, the coatings tend to water spot. In addition, adhesion may be marginal and coating uniformity may be difficult to obtain. It is, therefore, an object to provide lacquer compositions from which a number of desirable coating properties are obtained.

DESCRIPTION OF THE INVENTION

The lacquers of this invention comprise organic solvent solutions of the following essential ingredients: nitrocellulose, a copolymer of ethylene/vinyl acetate and sucrose acetate isobutyrate. The particular solvent system is not critical and may be used in the conventional manner to provide a lacquer having a solids content in the range from about 15 to 25% by weight. It is necessary, however, to combine the other ingredients in a restrictive manner. The nitrocellulose should comprise, by weight, from about 40 to 60%, preferably 45 to 55% of the solids content; the ethylene/vinyl acetate copolymer from about 10 to 30%, preferably 15 to 25% of the solids content; and the sucrose acetate isobutyrate from about 20 to 40%, preferably 25 to 35% of the solids content. The nitrocellulose may be selected from a variety of commercially available grades. The lower viscosity explosive grade nitrocelluloses are preferred. Selection of the ethylene/vinyl acetate copolymer is made from those copolymers having a copolymerized vinyl acetate content from about 43 to 55%, preferably 43 to 49% by weight, and a melt index from about 70 to 160, preferably about 100 to 140.

By maintaining the proportions of ingredients within the aforementioned limits and using the particular ethylene/vinyl acetate copolymer described, a very hard, moisture-resistant lacquer is obtained. In fact, the lacquer provides coatings which are more than twice as hard as coatings obtained from commercially available nitrocellulose lacquers containing alkyd resins. This is indeed surprising in view of the fact that ethylene/vinyl acetate copolymers are generally considered to be soft polymers which tend to decrease surface hardness in coating compositions.

The lacquers of this invention can be prepared by conventional methods. In commercial processes, all of the ingredients may be added to a high-speed mixer and blended to provide a homogeneous solution. In a batch-type operation, it may be desirable to dissolve the ethylene/vinyl acetate copolymer in toluene or xylene or a similar hydrocarbon solvent and then add the sucrose acetate isobutyrate to the solution. In order to facilitate mixing the nitrocellulose with the other components, it may be advantageous to mix the nitrocellulose with a small percentage, e.g., about 5%, of the requirements of the hydrocarbon solvent which is not a solvent for the nitrocellulose, and then add a solvent for the nitrocellulose, e.g., a lower alkyl alcohol such as isopropyl alcohol and an additional solvent such as n-butyl acetate. It will, of course, be appreciated that the ethylene/vinyl acetate and nitrocellulose are not generally soluble in the same solvents; however, suitable conventional solvents in addition to those just mentioned may be selected from those commercially available.

The ethylene/vinyl acetate copolymers used in the lacquers of this invention may be prepared by methods well-known in the art. The procedures described in U.S. Patents 2,200,429 and 2,703,794 may be used. The vinyl acetate content of the copolymer can be determined by infrared analysis or by saponification number determination. The melt index of these copolymers is determined by tentative ASTM Test Method D1238–62T using a temperature of 190° C. and a load of 2160 grams and is reported as the flow rate in grams per ten minute interval.

The following example, in which parts and percentages are by weight unless otherwise specified, further illustrates the compositons of this invention.

Example

A clear lacquer was prepared by mixing the ingredients set forth in Table 1 in the following proportions:

TABLE 1

| Ingredients: | Amount, percent |
|---|---|
| Nitrocellulose [1] | 50 |
| Ethylene/vinyl acetate copolymer [2] | 20 |
| Sucrose acetate isobutyrate | 30 |
| Total solids | 100 |
| Toluene | 50 |
| Isopropyl alcohol | 15 |
| n-Butyl acetate | 35 |
| Total solvent | 100 |

[1] One-quarter second explosive grade nitrocellulose, Viscosity measured by ASTM method D–301–56.
[2] Vinyl acetate content of 45.8% and melt index of 120.

The lacquers were made by first placing a mixture of the isopropyl alcohol and n-butyl acetate in a ball mill. Prior to adding the nitrocellulose to the ball mill, it was prewetted with a small portion (about 5%) of the final toluene requirement in order to prevent agglomeration prior to starting the mill. The ethylene/vinyl acetate copolymer was then dissolved in the remaining toluene and sucrose acetate isobutyrate was then dissolved in this solution. The nitrocellulose solution was withdrawn from the ball mill, and the ethylene/vinyl acetate-sucrose acetate isobutyrate solution was stirred into it. The combined liquid mixture was returned to the ball mill and milled until a homogeneous solution was obtained. The solvent content of separate portions of the solution was adjusted to provide lacquer compositions having 20, 21.8 and 24% by weight of solids. These compositions had a viscosity at room temperature as measured with a No. 4 Ford Cup of 39 seconds, 46 seconds, and 71 seconds, respectively, which indicated that all could be applied by conventional coating methods.

A quart of the 20% solids lacquer was placed in a suction-type commercial spray gun, and the lacquer was sprayed onto aluminum and sanded maple plywood panels to provide dried coatings approximately one mil in thickness. The aluminum panels were 4″ x 12″ x 0.15″ chromate-treated panels and the maple panels were 6″ x 8″ x 0.25″.

The coated aluminum panels were tested with the following results being obtained:

TABLE 2

Reverse impact strength [3] _____ in. lb__ 1
Hardness [4] _____ KHN__ 14.51
Cross-cut adhesion [5] _____ percent__ 100

[3] Determined using a Gardner impact tester with a four-pound weight.
[4] Measured using a Tukon tester (Tukon number converted to Knoop hardness number).
[5] Described by Gardner and Sward in "Paint Test Manual" 12th Edition, March 1962 (Procedure modified to use 25 squares per inch).

It will be noted from the foregoing data that the coatings were quite hard. In a comparative experiment, a commercially available nitrocellulose lacquer containing an alkyd resin was found to have a Knoop hardness number of only 6.36. The wood panels were sanded with a fine silicon carbide sandpaper following Federal Test Method Std. No. 141a, Sept. 1, 1965 (modified by using a 1300 gram 2.5" x 2.5" block). There was no clogging of the sandpaper, and the scuffed-off portion of the coating was in powdered form.

In other experiments, it was found that substitution of ethylene/vinyl acetate copolymers having higher melt indices did not reduce the viscosity of the lacquers containing nitrocellulose and sucrose acetate isobutyrate. This is quite unexpected and is indicative of a particular compatibility between the ethylene/vinyl acetate copolymers used in the lacquers of this invention, nitrocellulose and sucrose acetate isobutyrate.

It will, of course, be apparent to those skilled in the art that in addition to the clear lacquers which have been described herein, fillers, pigments and dyes as well as other additives may be included in the novel compositions. These lacquers, both with or without additives, are useful in the coating of a variety of substrates in addition to the aluminum and wood panels described in the foregoing example.

We claim:
1. An organic solvent containing lacquer composition having a solids content comprised of the following essential ingredients: (A) from about 40 to 60% by weight of nitrocellulose, (B) from about 10 to 30% by weight of an ethylene/vinyl acetate copolymer having a copolymerized vinyl acetate content of about 43 to 55% by weight and a melt index from about 70 to 160, and (C) from about 20 to 40% by weight of sucrose acetate isobutyrate.

2. The composition of claim 1 in which the ethylene/vinyl acetate copolymer is present in an amount from about 15 to 25% by weight, and the sucrose acetate isobutyrate is present in an amount from about 25 to 35% by weight.

3. The composition of claim 2 wherein said ethylene/vinyl acetate copolymer has a melt index from about 100 to 140 and a vinyl acetate content from about 43 to 49% by weight of said polymer.

4. The composition of claim 3 wherein the solids content is comprised of 50% nitrocellulose, 20% of said copolymer and 30% sucrose acetate isobutyrate and said solvent component is comprised of 50% by weight of toluene, 15% by weight of isopropyl alcohol and 35% by weight of n-butyl acetate.

References Cited

UNITED STATES PATENTS

| | | | |
|---|---|---|---|
| 3,051,670 | 8/1962 | Grantham | 260—17 |
| 3,321,420 | 5/1967 | Unger | 260—17 |
| 3,338,778 | 8/1967 | Hutchins et al. | 161—226 |

WILLIAM H. SHORT, Primary Examiner

L. M. PHYNES, Assistant Examiner

U.S. Cl. X.R.

117—127, 148